(12) United States Patent
Kwon et al.

(10) Patent No.: US 8,153,540 B2
(45) Date of Patent: Apr. 10, 2012

(54) SODA-LIME-SILICA GLASS COMPOSITION FOR A DISPLAY SCREEN

(75) Inventors: Sung-Min Kwon, Bucheon (KR); Jerome Lalande, Saint-Maur des Fosses (FR)

(73) Assignee: Saint-Gobain Glass France, Courbevoie (FR)

( * ) Notice: Subject to any disclaimer, the term of this patent is extended or adjusted under 35 U.S.C. 154(b) by 288 days.

(21) Appl. No.: 12/522,964

(22) PCT Filed: Jan. 11, 2008

(86) PCT No.: PCT/FR2008/050057
§ 371 (c)(1),
(2), (4) Date: Aug. 17, 2009

(87) PCT Pub. No.: WO2008/099112
PCT Pub. Date: Aug. 21, 2008

(65) Prior Publication Data
US 2010/0089606 A1    Apr. 15, 2010

(30) Foreign Application Priority Data

Jan. 12, 2007 (FR) ..................................... 07 00242
Apr. 24, 2007 (FR) ..................................... 07 54666

(51) Int. Cl.
*C03C 3/087* (2006.01)
(52) U.S. Cl. ........................... 501/70; 313/582; 313/636
(58) Field of Classification Search .................... 501/70; 313/582, 636
See application file for complete search history.

(56) References Cited

U.S. PATENT DOCUMENTS

| | | | |
|---|---|---|---|
| 5,599,754 A | 2/1997 | Maeda et al. | |
| 5,858,897 A * | 1/1999 | Maeda et al. | 501/70 |
| 5,925,583 A * | 7/1999 | Yoshii et al. | 501/70 |
| 5,958,812 A | 9/1999 | Koch et al. | |
| 6,054,401 A * | 4/2000 | Sugiura et al. | 501/70 |
| 6,063,718 A * | 5/2000 | El Khiati et al. | 501/70 |
| 6,268,304 B1 * | 7/2001 | Maeda et al. | 501/65 |
| 6,810,688 B1 * | 11/2004 | Duisit et al. | 65/30.13 |
| 2002/0147102 A1 * | 10/2002 | Yamazaki et al. | 501/70 |
| 2005/0096209 A1 * | 5/2005 | Kase et al. | 501/56 |
| 2005/0244656 A1 * | 11/2005 | Ikenishi et al. | 428/426 |
| 2005/0245384 A1 * | 11/2005 | Ito | 501/70 |
| 2006/0216552 A1 * | 9/2006 | Ikenishi et al. | 428/846.9 |
| 2007/0037686 A1 * | 2/2007 | Goulas | 501/70 |
| 2008/0131628 A1 * | 6/2008 | Abensour et al. | 428/34 |
| 2008/0214380 A1 * | 9/2008 | Abensour et al. | 501/41 |

FOREIGN PATENT DOCUMENTS

| | | | |
|---|---|---|---|
| EP | 853070 A1 * | 7/1998 | |
| FR | 2 762 838 | 11/1998 | |
| FR | 2 876 094 | 4/2006 | |
| GB | 2 317 611 A | 4/1998 | |
| JP | 2006131482 A * | 5/2006 | |
| WO | WO 98/01400 | 1/1998 | |
| WO | WO 2004099096 A2 * | 11/2004 | |
| WO | WO 2006037917 A1 * | 4/2006 | |
| WO | WO 2006131682 A2 * | 12/2006 | |

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The invention relates to the field of display screens, especially plasma screens. One subject of the invention is a glass composition which comprises the constituents below in the following weight proportions:

| | |
|---|---|
| $SiO_2$ | 55-75%; |
| $Al_2O_3$ | 1-5%; |
| $ZrO_2$ | 1-5%; |
| $Na_2O$ | 1-5.5%; |
| $K_2O$ | 1-9%, preferably 1-8.5%, and advantageously 1-7.5%; |
| CaO | 7-11%; and |
| SrO | 3-9%, preferably 3.5-9%, and advantageously 4.5-9%, | said composition having an $Al_2O_3/ZrO_2$ weight ratio varying from 0.7 to 1.8, preferably from 0.7 to 1.2. The substrates obtained have a strain point at least equal to 570° C. and a coefficient of thermal expansion $\alpha_{20-300}$ between 70 and $90 \times 10^{-7}$/° C.

20 Claims, No Drawings

SODA-LIME-SILICA GLASS COMPOSITION FOR A DISPLAY SCREEN

The present application is the U.S. counterpart of WO 2008/099112, the text of which is incorporated by reference and claims the priority of the French application No. 0754666 filed on 24 Apr. 2007 and 0700242 filed on Jan. 12, 2007, the text of which is incorporated by reference.

The invention relates to soda-lime-silica glass compositions suitable for being converted into glass ribbon from which sheets can be cut that have good heat resistance. These sheets are especially used as a substrate for manufacturing display screens, in particular plasma screens.

A plasma screen is generally composed of two glass sheets, more commonly known as "substrates", having a thickness of 2.8 to 3 mm, welded by a glass frit and separated by a space in which a mixture of plasma gases (Ne, Xe, Ar) is trapped. The front substrate comprises, on its inner face, a deposition of indium tin oxide (ITO) that serves as a cathode. The rear substrate is equipped, on its inner face, with an anode (Ni, Ag) and phosphors which, when they are excited by the ultraviolet radiation emitted by the plasma gas mixture undergoing plasma discharge between the two substrates, produce visible light radiation (red, green, blue). The image produced from this radiation is projected through the front substrate.

Conventionally, the glass used for producing substrates is a soda-lime-silica glass, of the type used for manufacturing windows for automobiles and for the building industry. This glass has advantageous properties in terms of flatness, glass defects, optical properties and chemical resistance. However, it has emerged that the temperature resistance is not very high.

During the manufacture of such screens, the substrate is subjected to several heat treatments, the objective of which is to stabilize the dimensions of said substrate and to attach a series of layers of various compounds deposited on its surface as already mentioned. The attachment of these layers having varying thicknesses requires that the substrate be brought to temperatures above 550° C. Soda-lime-silica glass has a strain point generally close to 510° C., so that at the treatment temperatures indicated, the glass does not have sufficient resistance and it is necessary to place it on a ground slab in order to avoid any deformation during the treatments. Given that the tendency is to increase the size of the screens and therefore of the substrates, this drawback becomes unacceptable.

Furthermore, soda-lime-silica glass contains a high proportion of $Na_2O$ which is capable of reacting with the silver forming the electrodes. During the heat treatments, an exchange phenomenon may occur by permeation of the $Na^+$ and $Ag^+$ ions, and these ions may react by forming an $Ag°$ colloid which absorbs some of the UV radiation, thus causing a yellowing effect in the glass. The effect linked to the yellowing may be avoided by inserting a layer of $SiO_2$ between the glass and the silver electrodes.

Novel families of glass compositions have been developed and described for overcoming these drawbacks, especially in order to be able to obtain substrates that have almost zero deformation during heat treatments of around 550 to 600° C. (see WO 96/11887 A and WO 98/40320 A).

It appears, however, that these glass compositions may have risks of breaking during the heat treatments of the layers deposited on the glass, especially at the edges of the substrate.

Specifically, the substrate cut from the glass ribbon obtained under the conditions of the float process, in which the glass floats on a bath of molten metal, undergoes an edge-shaping step consisting, via a mechanical treatment, in removing the sharp edges as the latter have numerous defects from which cracks may propagate under the effect of thermal stresses. These cracks are even larger when the substrate is subjected to repeated thermal gradients. The mechanical quality of the shaping step is directly linked to the nature of the glass, especially to its ability to withstand damage caused by indentation.

Added to this is the problem of lightening the weight which, due to the constant increase in the dimensions of the substrates, becomes a significant preoccupation for screen manufacturers.

One object of the present invention is to provide a glass composition for obtaining substrates, especially those intended for producing plasma-type display screens, which makes it possible to obtain a good compromise between the density and the mechanical properties, this composition advantageously having an annealing temperature at least equal to 570° C. and a coefficient of thermal expansion between 70 and $90 \times 10^{-7}/°$ C.

Another object of the present invention is to provide a glass composition that makes it possible to obtain a substrate which has improved mechanical properties, especially a better resistance to thermal gradients, which makes it possible to reduce the risk of the glass breaking, in particular at the edges.

Another object of the invention is also to provide a glass composition which makes it possible to produce a glass substrate having a better ability to withstand scratching.

The composition according to the invention comprises the constituents below in the following weight proportions:

| | |
|---|---|
| $SiO_2$ | 55-75%; |
| $Al_2O_3$ | 1-5%; |
| $ZrO_2$ | 1-5%; |
| $Na_2O$ | 1-5.5%; |
| $K_2O$ | 1-9%, preferably 1-8.5%, and advantageously 1-7.5%; |
| CaO | 7-11%; and |
| SrO | 3-9%, preferably 3.5-9%, and advantageously 4.5-9%, | said composition having an $Al_2O_3/ZrO_2$ weight ratio varying from 0.7 to 1.8, preferably from 0.7 to 1.2.

The composition according to the invention has a density which varies from 2.5 to 2.7, preferably is less than or equal to 2.65 and advantageously is greater than or equal to 2.55.

As already indicated, the composition according to the invention advantageously has a strain point at least equal to 570° C. and a coefficient of thermal expansion $\alpha_{20-300}$ between 70 and $90 \times 10^{-7}/°$ C.

It is generally accepted that glass no longer exhibits any viscous behavior below a characteristic temperature known as the strain point which corresponds to a viscosity of around $10^{14.5}$ poise. Therefore, this temperature is an interesting reference point for evaluating the temperature resistance of a glass. Owing to the combination of the constituents such as results from the definition of the invention, the glass compositions corresponding to this definition have a strain point which is at least 50° C., preferably at least 60° C., above that of a conventional soda-lime-silica glass. Preferably, the strain point is above 580° C.

This combination of constituents also makes it possible to obtain a glass whose coefficient of thermal expansion (CTE) remains of the same order of magnitude as that of a conventional soda-lime-silica glass.

Preferably, the coefficient of thermal expansion of the glass composition is between 75 and $85 \times 10^{-7}/°$ C. Such values are advantageous, in particular, for their compatibility with that of the glass frits normally used to weld the substrates in the plasma screens.

The constituents incorporated into the glass composition according to the invention are described below.

$SiO_2$ plays an essential role as a base network former of the glass. Below 55 wt % of $SiO_2$, the stability of the glass is insufficient, which is especially expressed by a low chemical and hydrolytic resistance. The $SiO_2$ content does not exceed 75 wt %; beyond that melting of the glass batch and refining of the glass require high temperatures which accelerate the wear of the furnace refractories. Furthermore, it has been observed that the increase of the $SiO_2$ content has no effect on the raising of the strain point of the glass. The glass compositions according to the invention which melt most easily, which have a suitable viscosity for production by floating the glass on a bath of molten metal and which have the highest strain point contain at least 60% of $SiO_2$, preferably between 65% and 70%.

$Al_2O_3$ acts as a stabilizer; it helps to improve the chemical resistance of the glass and promotes the increase of the strain point. The percentage of $Al_2O_3$ does not exceed 5% in order to avoid too large a drop in the coefficient of thermal expansion. Preferably, the $Al_2O_3$ content is greater than or equal to 1%, and advantageously between 2 and 4%.

$ZrO_2$ also acts as a stabilizer. Just like $Al_2O_3$, it improves the chemical resistance of the glass and promotes the increase of the strain point. Above 5%, the risk of devitrification increases and the coefficient of thermal expansion decreases. The $ZrO_2$ content is preferably greater than 1%, advantageously varies from 2 to 4% and better still varies from 2.5 to 3.5%.

Generally, the sum of the $SiO_2$, $Al_2O_3$ and $ZrO_2$ contents is less than or equal to 78% in order that the melting of the glass remains within acceptable temperature limits for production via the process of floating the glass on a bath of molten metal. It is considered that these limits are acceptable when the temperature of the glass corresponding to a viscosity $\eta$ of 100 poise does not exceed 1550° C. and preferably 1510° C. The sum of the $SiO_2$, $Al_2O_3$ and $ZrO_2$ contents is preferably greater than or equal to 65%.

$Na_2O$ and $K_2O$ make it possible to keep the melting point and the high-temperature viscosity within the limits given previously. They also make it possible to control the coefficient of thermal expansion. The total content of $Na_2O$ and $K_2O$ is generally at least equal to 8%, preferably at least equal to 10%. Above 12%, the strain point decreases significantly. In comparison with a conventional soda-lime-silica glass, the simultaneous presence of these two oxides in the glass composition according to the invention makes it possible to considerably increase its chemical resistance, more precisely its hydrolytic resistance, and also its electrical resistivity. The increase of the electrical resistivity of the glass compositions makes it possible to decrease the diffusion of the ions, for example silver ions, in the glass originating from the layers deposited at the surface of the substrates such as has already been mentioned. The increase in the electrical resistivity is also advantageous in applications where the glass compositions are used as substrates for field-emission displays. In these displays, surface electric fields are created which cause a localized concentration of electrons which may induce, by reaction, an undesirable migration of the alkali metals if the resistivity of the glass is insufficient, as in the case of an ordinary soda-lime-silica glass.

The increase in the total content of $Na_2O$ and $K_2O$ is generally carried out by increasing the proportion of $K_2O$, which has the advantage of making the glass more fluid without decreasing the strain point. As a general rule, the $K_2O/Na_2O$ weight ratio is at least equal to 1, preferably at least equal to 1.2.

The alkaline-earth oxides CaO and SrO have the effect of decreasing the melting point and the high-temperature viscosity of the glass. They also make it possible to overall increase the strain point. The total content of these oxides is generally at least 12%. Above 17%, the risk of devitrification increases and may become incompatible with the conditions of the process for floating the glass on a bath of molten metal.

SrO helps to raise the strain point and makes it possible to increase the chemical resistance of the glass. Its content varies from 3 to 9%, preferably from 3.5 to 9%, advantageously from 4.5 to 9% and better still varies from 4.5 to 6.6%.

Generally, the total content of BaO and MgO in the composition according to the invention does not exceed 1% and is preferably zero.

It has been found that the glass composition according to the invention results in a low corrosion of refractories of the AZS (alumina-zirconia-silica) type used conventionally in this type of furnace. The glass thus allows an optimization of the service life of the furnace.

The glass composition according to the invention also has the advantage of being able to be melted and converted to a glass ribbon by floating the glass on a bath of molten metal at temperatures close to those used for manufacturing a conventional soda-lime-silica glass.

Thus, the glass composition according to the invention has a sufficient gap between the glass forming temperature and the liquidus temperature; specifically, in the float glass technique, it is important that the liquidus temperature of the glass remains less than or equal to the temperature corresponding to $\log\eta=3.5$, which is the case for the glass compositions according to the invention. This gap is advantageously at least 10° C. to 30° C. and remains "accessible" without significant modification or risk taking as regards the furnace.

The glass ribbon is then cut to suitable dimensions in particular for forming the substrates for a display screen. The substrates then undergo a shaping step, via mechanical treatment, of the edges in order to limit the risks of breakages.

It has been found that the glass obtained from the composition according to the invention has improved mechanical properties, especially a better scratch resistance and better resistance to thermal gradients.

The scratch resistance is evaluated by measurement of the value of the c/a ratio defined by the brittleness test described in detail in the examples.

The c/a ratio measures the sensitivity of the glass to surface damage by Vickers indentation: a glass is all the more scratch resistant when its c/a value is low.

The glass obtained from the composition according to the invention has a c/a value below 3.85, preferably below 3.70 and advantageously below 3.60 and better still below 3.50.

The resistance to thermal gradients is measured by the product $\phi^2 \cdot c/a$ in which $\phi$ is the thermal stress factor defined according to the equation:

$$\phi = \alpha \cdot E/(1-\nu)$$

in which: $\alpha$ is the coefficient of thermal expansion (CTE);
E is the modulus of elasticity; and
$\nu$ is Poisson's ratio.

The product $\phi^2 \cdot c/a$ takes into account the sensitivity of the glass sheet to thermal stresses, especially during the manufacture of the screen, in particular at the shaped edges. The glass is all the more resistant to thermal gradients when the value $\phi^2 \cdot c/a$ is low. The glass obtained from the composition according to the present invention has a value of $\phi^2 \cdot c/a$ below 2.75 MPa$^2$/° C.$^2$, preferably below 2.30 MPa$^2$/° C.$^2$, and advantageously below 2.20 MPa$^2$/° C.$^2$.

The following examples allow the invention to be illustrated without however limiting it.

The glass is produced by melting the glass compositions comprising the constituents given in Table 1, expressed as weight percentages.

On the glass obtained, the following were measured:

The modulus of elasticity E and the Poisson's ratio determined by the following test: a glass test piece having dimensions of 100×10 mm$^2$ and a thickness of less than 6 mm was subjected to 4-point bending in which the outer bearing points were separated by 90 mm and the inner bearing points by 30 mm. A strain gauge was bonded to the center of the glass sheet. The main strains (in the length of the sheet and in its width) were deduced therefrom. The stress applied was calculated from the force applied. The relationships between the main stress and strains allowed the modulus of elasticity E and Poisson's ratio to be determined and the value of $\phi$ to be calculated;

the value c/a defined by the following brittleness test: the glass was first annealed in order to remove the residual stresses. The glass was brought to its annealing point for one hour, then cooled to ambient temperature at a rate of 2° C./minute. The glass test piece to be tested was indented with a 1000 g load for 30 seconds at ambient temperature. The diagonals of the Vickers impression and the size of the radial cracks (Lawn and Marshall, J. Am. Cer. Soc. 62, p. 347-350 (1979); Sehgal et al., J. Mat. Sci. Let. 14, p. 197-169 (1995)) were measured 1 hour after indentation. The c/a ratio of the length of the radial cracks to the semi-diagonal was measured on 10 indentations in order to obtain sufficient statistics.

The compositions of Example 1 to 8 and 10 according to the invention made it possible to obtain glass compositions whose strain point and coefficient of thermal expansion were compatible with use as a substrate for a display screen.

The composition from Example 5 had an acceptable density and values of c/a and of $\phi^2 \cdot$c/a below those of of Comparative Example 9, thus demonstrating a better resistance of the glass to scratching and to thermal gradients.

The composition of Example 10 had a lower density than that of the Comparative Example 9 and comparable properties of scratch resistance and resistance to thermal gradients.

The glass compositions from Examples 5 and 10 also had viscosity and liquidus properties compatible with the conditions for producing conventional soda-lime-silica glass.

TABLE 1

| | Example | | | | | | | | | |
|---|---|---|---|---|---|---|---|---|---|---|
| | 1 | 2 | 3 | 4 | 5 | 6 | 7 | 8 | 9 (comp.) | 10 |
| SiO$_2$ | 68.2 | 69.5 | 68.5 | 66.7 | 68.2 | 67.3 | 67.9 | 68.1 | 68.8 | 66.4 |
| Al$_2$O$_3$ | 2.8 | 2.8 | 2.8 | 3.7 | 2.8 | 2.7 | 2.9 | 3.0 | 0.6 | 3.9 |
| ZrO$_2$ | 2.5 | 3.0 | 3.5 | 3.5 | 2.5 | 2.7 | 2.7 | 2.8 | 4.2 | 2.3 |
| Na$_2$O | 4.8 | 4.5 | 4.5 | 4.7 | 4.8 | 4.1 | 4.4 | 4.7 | 4.2 | 4.9 |
| K$_2$O | 6.3 | 6.0 | 6.2 | 6.1 | 6.3 | 6.6 | 6.6 | 6.1 | 5.5 | 7.2 |
| CaO | 9.8 | 8.4 | 9.9 | 9.7 | 9.8 | 10.2 | 9.8 | 9.6 | 9.9 | 10.3 |
| SrO | 5.6 | 5.9 | 4.6 | 5.7 | 5.6 | 6.4 | 5.7 | 5.7 | 6.8 | 5.0 |
| Al$_2$O$_3$/ZrO$_2$ | 1.12 | 0.93 | 0.80 | 1.05 | 1.12 | 1.00 | 1.07 | 1.07 | 0.14 | 0.78 |
| Strain point (° C.) | 583 | 576 | 585 | 585 | 583 | 585 | 582 | 579 | 585 | 576 |
| $\alpha_{20\text{-}300}$ (10$^{-7}$/° C.) | 81 | 77 | 78 | 79 | 81 | 80 | 79 | 79 | 76 | 83 |
| T$_{log\eta}$ = 3.5 (° C.) | 1202 | n.d. | 1233 | n.d. | 1202 | n.d. | n.d. | n.d. | 1200 | n.d. |
| T$_{log\eta}$ = 2 (° C.) | 1534 | n.d. | 1584 | n.d. | 1534 | n.d. | n.d. | n.d. | 1528 | n.d. |
| T$_{liq}$ (° C.) | 1160 | 1150 | 1180 | n.d. | 1160 | n.d. | n.d. | n.d. | 1160 | n.d. |
| $\phi$ (N/mm$^2$ · ° C.) | n.d. | n.d. | n.d. | n.d. | 0.78 | n.d. | n.d. | n.d. | 0.78 | 0.84 |
| c/a | n.d. | n.d. | n.d. | n.d. | 3.49 | n.d. | n.d. | n.d. | 3.78 | 3.51 |
| $\phi^2$ · c/a (MPa$^2$/° C.$^2$) | n.d. | n.d. | n.d. | n.d. | 2.17 | n.d. | n.d. | n.d. | 2.31 | 2.46 |
| Density | 2.63 | 2.58 | n.d. | 2.62 | 2.63 | n.d. | n.d. | n.d. | 2.64 | 2.57 | n.d.: not determined.

The invention claimed is:

1. A glass composition of soda-lime-silica type, comprising in the following weight proportions based on the total weight:

| | |
|---|---|
| SiO$_2$ | 55-75%; |
| Al$_2$O$_3$ | 1-5%; |
| ZrO$_2$ | 1-5%; |
| Na$_2$O | 1-5.5%; |
| K$_2$O | 1-9%, |
| BaO and MgO | less than 1% |
| CaO | 7-11%; and |
| SrO | 3-9%, | wherein an Al$_2$O$_3$/ZrO$_2$ weight ratio varies from 0.7 to 1.2.

2. The composition according to claim 1, wherein the composition has a strain point at least equal to 570° C.

3. The composition according to claim 1, wherein the composition has a coefficient of thermal expansion $\alpha_{20\text{-}300}$ between 70 and 90×10$^{-7}$/° C.

4. A substrate for a display screen comprising the glass composition according to claim 1.

5. A display screen comprising two glass substrates separated by a space containing a plasma gas mixture, wherein at least one of the substrates comprises a glass having a composition according to claim 1.

6. The glass composition of soda-lime-silica type according to claim 1, comprising based on the total weight:

| | |
|---|---|
| $SiO_2$ | 55-75%; |
| $Al_2O_3$ | 1-5%; |
| $ZrO_2$ | 1-5%; |
| $Na_2O$ | 1-5.5%; |
| $K_2O$ | 1-8.5%,; |
| CaO | 7-11%; and |
| SrO | 3.5-9%. |

7. The glass composition of soda-lime-silica type according to claim 1, comprising based on the total weight:

| | |
|---|---|
| $SiO_2$ | 55-75%; |
| $Al_2O_3$ | 1-5%; |
| $ZrO_2$ | 1-5%; |
| $Na_2O$ | 1-5.5%; |
| $K_2O$ | 1-7.5%,; |
| CaO | 7-11%; and |
| SrO | 4.5-9%. |

8. The substrate for a plasma screen according to claim 4, wherein the substrate is obtained from a glass sheet cut out from a glass ribbon obtained by floating the glass on a bath of molten metal.

9. The composition according to claim 1, wherein the composition has a strain point at least equal to 580° C.

10. The composition according to claim 1, wherein the composition has a coefficient of thermal expansion $\alpha_{20\text{-}300}$ between 75 and $85\times10^{-7}$/° C.

11. A substrate for a display screen comprising the glass composition according to claim 2.

12. A display screen comprising two glass substrates separated by a space containing a plasma gas mixture, wherein at least one of the substrates comprises a glass having a composition according to claim 2.

13. A substrate for a display screen comprising the glass composition according to claim 3.

14. A display screen comprising two glass substrates separated by a space containing a plasma gas mixture, wherein at least one of the substrates comprises a glass having a composition according to claim 3.

15. A substrate for a display screen comprising the glass composition according to claim 6.

16. A display screen comprising two glass substrates separated by a space containing a plasma gas mixture, wherein at least one of the substrates comprises a glass having a composition according to claim 6.

17. A substrate for a display screen comprising the glass composition according to claim 7.

18. A display screen comprising two glass substrates separated by a space containing a plasma gas mixture, wherein at least one of the substrates comprises a glass having a composition according to claim 7.

19. The composition according to claim 1, which does not comprise BaO and MgO.

20. The composition according to claim 1, consisting essentially of in the following weight proportions based on the total weight:

| | |
|---|---|
| $SiO_2$ | 55-75%; |
| $Al_2O_3$ | 1-5%; |
| $ZrO_2$ | 1-5%; |
| $Na_2O$ | 1-5.5%; |
| $K_2O$ | 1-9%; |
| BaO and MgO | less than 1%; |
| CaO | 7-11%; and |
| SrO | 3-9%, | wherein an $Al_2O_3/ZrO_2$ weight ratio varies from 0.7 to 1.2.

* * * * *